(12) United States Patent
Cizek et al.

(10) Patent No.: US 6,959,132 B2
(45) Date of Patent: Oct. 25, 2005

(54) ONE-TO-M WAVELENGTH ROUTING ELEMENT

(75) Inventors: Nicholas Charles Cizek, Superior, CO (US); Samuel Paul Weaver, Boulder, CO (US)

(73) Assignee: PTS Corporation, San Jose, CA (US)

( * ) Notice: Subject to any disclaimer, the term of this patent is extended or adjusted under 35 U.S.C. 154(b) by 173 days.

(21) Appl. No.: 10/099,392

(22) Filed: Mar. 13, 2002

(65) Prior Publication Data

US 2003/0174958 A1 Sep. 18, 2003

(51) Int. Cl.[7] .............................................. G02B 6/26
(52) U.S. Cl. ........................ 385/47; 385/37; 385/26; 385/18; 359/226; 359/515
(58) Field of Search ...................... 385/47, 15–18, 385/20–22, 25, 26, 31, 36, 39, 37; 359/212, 216, 220, 223, 226, 515, 520, 522, 856, 857

(56) References Cited

U.S. PATENT DOCUMENTS

| | | | |
|---|---|---|---|
| 5,148,310 A | * | 9/1992 | Batchko ..................... 359/479 |
| 5,212,582 A | | 5/1993 | Nelson |
| 5,414,540 A | | 5/1995 | Patel et al. |
| 5,481,631 A | * | 1/1996 | Cahill et al. .................. 385/18 |
| 5,600,383 A | | 2/1997 | Hornbeck |
| 5,917,625 A | | 6/1999 | Ogusu et al. |
| 5,960,133 A | | 9/1999 | Tomlinson |
| 5,999,672 A | | 12/1999 | Hunter et al. |
| 6,028,689 A | | 2/2000 | Michalicek et al. |
| 6,040,935 A | | 3/2000 | Michalicek |
| 6,097,519 A | | 8/2000 | Ford et al. |
| 6,097,859 A | | 8/2000 | Solgaard et al. |
| 6,108,471 A | | 8/2000 | Zhang et al. |
| 6,128,122 A | | 10/2000 | Drake et al. |
| 6,275,626 B1 | * | 8/2001 | Laor ............................ 385/18 |
| 6,307,657 B1 | | 10/2001 | Ford |
| 6,418,247 B1 | * | 7/2002 | Presley ........................ 385/18 |
| 6,501,877 B1 | * | 12/2002 | Weverka et al. .............. 385/31 |
| 6,554,430 B2 | * | 4/2003 | Dorval et al. ................. 353/7 |

FOREIGN PATENT DOCUMENTS

| | | | | |
|---|---|---|---|---|
| FR | | 2581204 A1 | * 10/1986 | ........... G02B/06/36 |
| WO | WO 200137021 A1 | | * 5/2001 | ........... G02B/06/26 |
| WO | WO 02/10822 | | * 2/2002 | ............ G02B/6/34 |

OTHER PUBLICATIONS

Appl. No. 09/442,061, filed Nov. 16, 1999, Weverka et al.
Ford, Joseph E., et al., "Wavelength Add–Drop Switching Using Tilting Micromirrors," Journal of Lightwave Technology, vol. 17, No. 5, pp. 904–911, May 1999.
Grade, John D., et al., "A Large–Deflection Electrostatic Actuator for Optical Switching Applications," Solid State Sensor and Actuator Workshop, Hilton Head Island, S.C., pp. 97–100, Jun. 4–8, 2000.
Dewa, Andrew S., et al., "Development of a Silicon Two–Axis Micromirror for an Optical Cross–Connect," Soild–State Sensor and Actuator Workshop, Hilton Head Island, SC, Jun. 4–8, 2000.

(Continued)

Primary Examiner—David V. Bruce
Assistant Examiner—Chih-Cheng Glen Kao
(74) Attorney, Agent, or Firm—Townsend and Townsend and Crew LLP

(57) ABSTRACT

Retroreflecting elements adapted for use in one-to-M wavelength routing elements are provided. Each retroreflecting element is configured to retroreflect an optical ray that is orthogonal to a reference plane. A first reflective surface, such as may be provided by a mirror, is inclined with respect to the reference plane and is disposed to encounter the optical ray. The first reflective surface is also configured for rotation about an axis to multiple positions. A second reflective surface, such as may also be provided by a mirror, is inclined with respect to the first reflective surface. In at least one of the positions, the optical ray also encounters the second reflective surface.

16 Claims, 9 Drawing Sheets

OTHER PUBLICATIONS

Nishi, I., et al., "Broad–Passband–Width Optical Filter for Multi/Demultiplexer Using a Diffraction Grating and a Retroreflector Prism," Electronics Letters, vol. 21, No. 10, pp. 423–424, May. 9, 1985.

Philippe, P., et al., "Wavelength demultiplexer using echelette gratings on silicon substrate," Applied Optics, vol. 24, No. 7, pp. 1006–1011, Apr. 1, 1985.

Rallison, R.D., et al., "Dense Wavelength Division Multiplexing (DWDM) and the Dickson Grating," White Paper, Jan. 6, 2001.

Sun, Z.J., et al., "Demultiplexer with 120 Channels and 0.29–nm Channel Spacing," IEEE Photonics Technology Letters, vol. 10, No. 1, pp. 90–92, Jan. 1998.

Tang, William C., et al., "Electrostatically Balanced Comb Drive for Controlled Levitation," Technical Digest IEEE Solid–State Sensor and Actuator Workshop, pp. 23–27, Jun. 1990.

* cited by examiner

ONE-TO-M WAVELENGTH ROUTING ELEMENT

CROSS REFERENCES TO RELATED APPLICATIONS

This application is related to commonly assigned, concurrently filed U.S. patent application Ser. No. 10/098,805, entitled "TWO-BY-TWO WAVELENGTH ROUTING ELEMENT USING TWO-POSITION MEMS MIRRORS," by Nicholas Charles Cizek, the entire disclosure of which is herein incorporated by reference for all purposes.

BACKGROUND OF THE INVENTION

This application relates generally to fiber-optic communications. This application relates more specifically to techniques and devices for routing different spectral bands of an optical beam.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However, SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In some applications in optical networks, there is a need for a one-to-M optical switch, such as in applications that use large cross-connects. In some large cross-connect applications, the number of optical routing elements used to achieve the desired functions may scale with the number of ports or with the square of the number of ports. In such applications, the total number of one-to-M optical routing elements needed for an optical cross-connect of a given number of ports decreases as M increases, making it generally desirable to have optical routing elements that can accommodate larger values for M. In addition, the availability of optical routing elements that can accommodate larger values of M is desirable to assist in conforming to space restrictions when they exist.

BRIEF SUMMARY OF THE INVENTION

Thus, embodiments of the invention provide retroreflecting elements adapted for use in one-to-M wavelength routing elements. The retroreflecting elements may be used in at least two-pass and four-pass wavelength routing configurations. Each of the retroreflecting elements is configured to retroreflect an optical ray that is propagated along a direction orthogonal to a reference plane. A first reflective surface, such as may be provided by a mirror, is inclined with respect to the reference plane and is disposed to encounter the optical ray. The first reflective surface is also configured for rotation about an axis to a plurality of positions. It may be configured so that a continuum of positions may be reached or so that a discrete set of positions may be reached. A second reflective surface, such as may also be provided by a mirror, is inclined with respect to the first reflective surface. The path of the optical ray may differ for the different positions of the first reflective surface. In at least one of the positions, the optical ray also encounters the second reflective surface. Encounters with the reflective surfaces may be in any order, although in most configurations the first (rotatable) reflective surface will be the first encountered. In some embodiments, the included angle between the first and second reflective surfaces is substantially equal to 90°.

In one set of embodiments, each of the retroreflecting elements comprises a plurality of second reflective surfaces, which may be disposed around the first reflective surface. In certain of the plurality of positions for the first reflective surface, the optical ray is directed so that it encounters different ones of the second reflective surfaces. In some embodiments, one or more positions of the first reflective surface correspond to inactive positions for the retroreflecting element so that the optical ray encounters none of the second reflective surfaces. The axis about which the first reflective surface rotates may be provided such that it is substantially orthogonal to the reference plane, although other configurations are also possible. Also, the second reflective surfaces may be provided so that they are all approximately equally inclined with respect to the reference plane, although this is not required. Generally, in those embodiments where they are all equally inclined, the rotation axis for the first reflective surface will be orthogonal to the reference plane. The first reflective surface may have various shapes; in one embodiment, to accommodate rotation about an axis that is orthogonal to the reference plane, the first reflective surface has an elliptical shape so that its projection on the reference plane is circular.

In another set of embodiments, the second reflective surface is disposed in a fixed inclined relationship to the first reflective surface. In such embodiments, both the first reflective surface and a single second reflective surface are both always encountered by the optical ray. Such embodiments may be achieved by having the first and second reflective surfaces comprised by a common structure.

In a further set of embodiments, the second reflective surface comprises a frustoconical reflective surface disposed to surround the first reflective surface. The frustoconical reflective surface may be concentric about the rotation axis for the first reflective surface. In such embodiments, the curvature of the frustoconical reflective surface may be accommodated by disposing the reflective surfaces so that the optical beam is focused on the frustoconical reflective surface. An inactive state for the retroreflecting element may also be provided by including a gap in the frustoconical surface through which the optical ray is directed when the first reflective surface is in a position corresponding to the inactive state. Alternatively, an inactive state may be provided by including an absorptive portion on the frustoconical surface.

A plurality of the retroreflecting elements may be embodied as part of a routing mechanism within a one-to-M wavelength routing element. The one-to-M wavelength routing element is configured generally to receive light having a plurality of spectral bands at an input port and to direct selected ones of the spectral bands to one or more of M output ports. A free-space optical train is disposed between the input port and the M output ports to provide optical paths for routing the spectral bands. The optical train has a dispersive element disposed to intercept the light traveling from the input port. The routing mechanism has a plurality of the retroreflecting elements, corresponding generally to the spectral bands so that each spectral band may be routed to the desired output port depending on the position of the first reflective surface. In some instances, one or more spectral bands may be routed to none of the output ports by using the inactive state of the corresponding retroreflector(s). The input and output ports may be provided as the ends of input and output optical fibers, respectively, which may in one embodiment be disposed so that the output fibers are positioned circumferentially about the input fiber. It is noted that inactive states for the one-to-M wavelength routing element may be achieved with an inactive state for the retroreflecting elements or by omitting an output port at a position that would otherwise correspond to that state.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

Figure 1A:
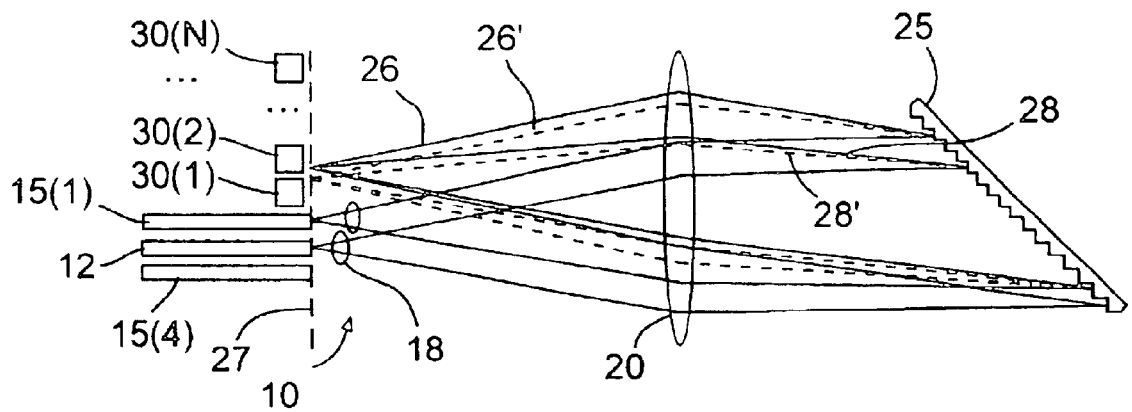
FIGS. 1A, 1B, and 1C are schematic top, side, and end views, respectively, of an optical routing element according to a first embodiment of the invention.

The following description sets forth embodiments of a wavelength routing element according to the invention. The general functionality of the wavelength routing element is to accept light having a plurality of (say N) spectral bands at an input port, and to direct the spectral bands according to their individual wavelengths to one or more of M output ports. Embodiments generally include a free-space optical train to provide optical paths for the spectral bands and a routing mechanism that includes a plurality of dynamically configurable retroreflecting elements arranged to route the individual spectral bands as desired. As used herein, a "retroreflecting element" causes an incident optical ray to be redirected along a path having a projection on the path of the incident ray that is opposite in direction to incident path. In a specific case, the redirected and incident paths are parallel but opposite in direction.

The term "free space" refers to the fact that light within the body of the wavelength routing element is not confined in the dimensions transverse to propagation, but can be regarding as diffracting in these transverse dimensions. Free-space optical trains may include airspace embodiments or embodiments in which the various beams are all within a body, such as of glass, examples of both of which are provided below. In some embodiments, the free-space optical train may be the same or similar to embodiments of free-space optical trains described in connection with copending, commonly assigned U.S. Pat. No. 6,501,877 entitled "WAVELENGTH ROUTER," filed Nov. 16, 1999 by Robert T. Weverka et al., the entire disclosure of which, including the Appendix, is herein incorporated by reference for all purposes.

Embodiments of the invention include a dispersive element, such as a diffraction grating or a prism, which operates to deflect incoming light by a wavelength-dependent amount. Different portions of the deflected light are intercepted by different dynamically configurable retroreflecting elements. Although the incoming light could have a continuous spectrum, adjacent segments of which could be considered different spectral bands, it is generally contemplated that the spectrum of the incoming light will have a plurality of spaced bands.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. Most of the embodiments contemplate that light will diverge as it enters the wavelength router after passing through the input port, and will be converging within the wavelength router as it approaches the output port. However, this is not necessary.

The International Telecommunications Union (ITU) has defined a standard wavelength grid having a frequency band centered at 193,100 GHz, and another band at every 100 GHz interval around 193,100 GHz. This corresponds to a wavelength spacing of approximately 0.8 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 50 GHz (corresponding to wavelength spacings of approximately 0.2 nm and 0.4 nm) are also of interest.

2. Wavelength Routing Element

Embodiments of the invention include various structures for the wavelength routing element, each of which may adopt principles described below for the dynamically configurable retroreflecting elements. Some such embodiments are described below although it will be understood that the dynamically configurable retroreflecting elements may be included in other wavelength routing element designs without exceeding the spirit and scope of the invention. Such designs may generally include both single-pass and double-pass routing elements.

Figure 1B:
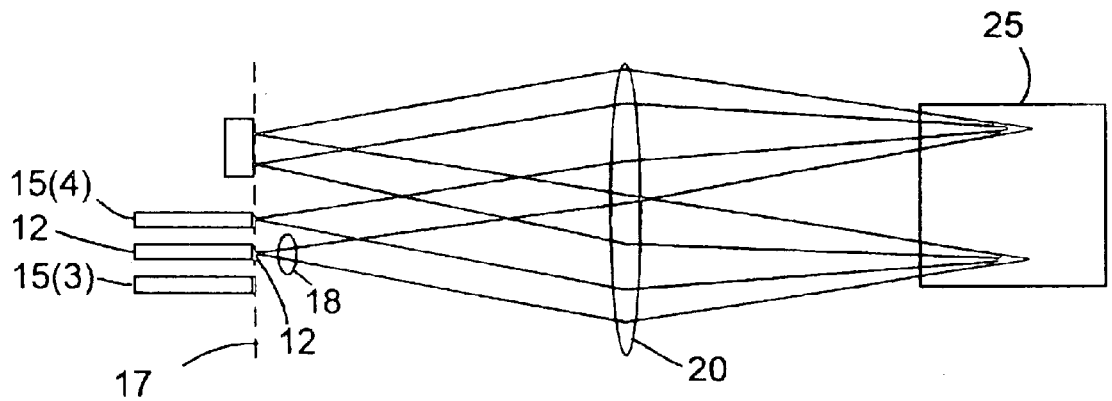
Figure 1C:
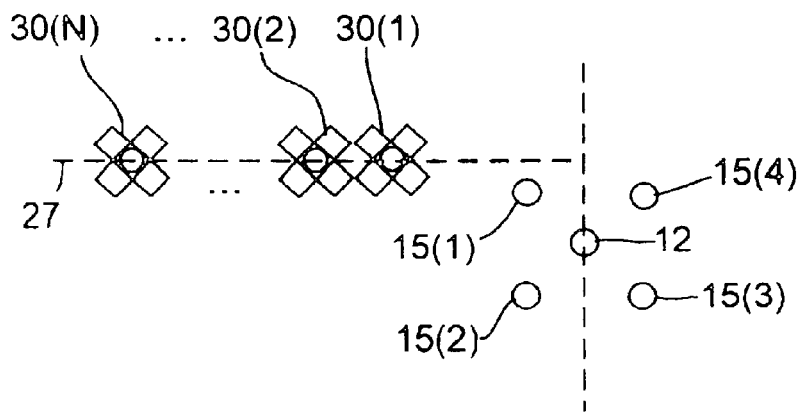

FIGS. 1A, 1B, and 1C are schematic top, side, and end views, respectively, of a wavelength routing element 10 according to one embodiment of the invention. The general functionality of the wavelength routing element 10 is to accept light having a plurality of (say N) spectral bands at an input port 12, and selectively to direct individual spectral bands to one of a plurality M of output ports. As shown in end view of FIG. 1C, the input port 12 and output ports 15 are generally coplanar in a plane defined by lines 17 and 27, which respectively extend generally perpendicular to the top and side views of FIGS. 1A and 1B. In one embodiment, the output ports 15 are positioned within the plane substantially equidistantly from the input port 12, thereby defining the vertices of a polygon that has the input port at its center. In some embodiments, the polygon is a regular polygon, but this is not required. In the exemplary embodiment of FIGS. 1A–1C, M=4 output ports 15 are provided so that the (regular) port arrangement shown in the end view of FIG. 1C is quincuncial. In the top and side views of FIGS. 1A and 1C, the input and output ports are shown as communicating with respective input and output optical fibers, but it should be understood that the input port could also receive light directly from a light source, and the output ports could be coupled directly to optical detectors.

Light entering the wavelength routing element 10 from the input port 12 forms a diverging beam 18, which includes the different spectral bands. The beam 18 encounters a lens 20, which collimates the light and directs it to a reflective diffraction grating 25. The grating 25 disperses the light so that collimated beams at different wavelengths are directed at different angles back towards the lens 20. Two such beams are shown explicitly and denoted 28 and 28', the latter drawn in dashed lines. Since these collimated beams encounter the lens at different angles, they are focused at different points along line 27 in a transverse focal plane. Line 27 extends in the plane of the top view of FIG. 1A.

The focused beams encounter respective ones of a plurality of dynamically configurable retroreflecting elements 30 (1, . . . , N), located near the focal plane. The retroreflecting elements 30 act as described below to redirect the spectral bands as diverging beams back towards the lens 20, the specific direction of each spectral band depending on the configuration of the corresponding retroreflecting element 30. As noted below, the configuration of the corresponding retroreflecting element 30 may also be chosen in certain embodiments to achieve selected attenuation of the spectral band. The beams 26 and 26' returning from the retroreflecting elements 30 are collimated by the lens 20 and directed again to the grating 25. The grating 25 removes the angular separation between different beams for which the corresponding retroreflecting elements 30 were similarly configured on its second encounter, and directs the collimated beams back to the lens 20, which focuses them. Depending on the configurations of the retroreflecting elements 30, different beams may be focused to different output ports 15.

Figure 2A:
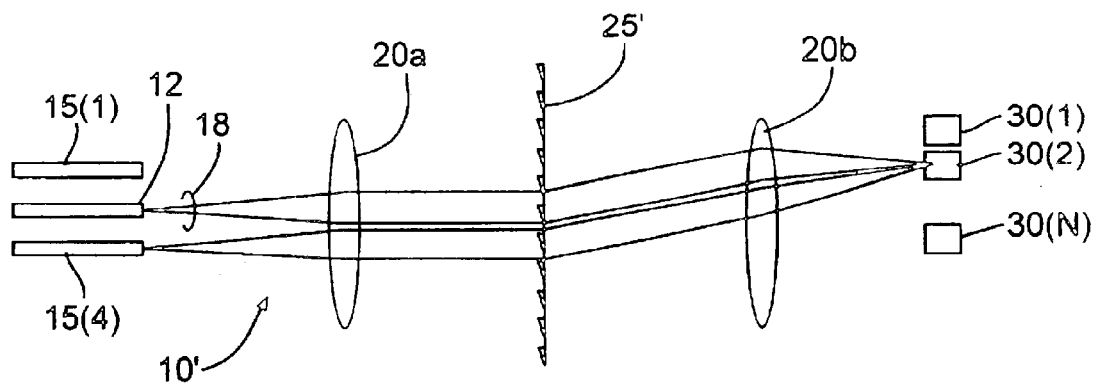
FIGS. 2A and 2B are schematic top and side views, respectively, of an optical routing element according to a second embodiment of the invention.
Figure 2B:
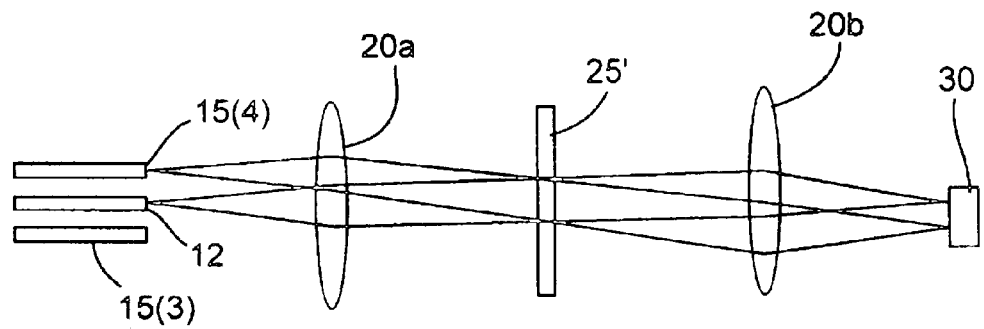

FIGS. 2A and 2B illustrate another embodiment for a one-to-M wavelength routing element 10' that differs from the embodiment of FIGS. 1A–1C in that it uses a transmissive diffraction grating 25' and a pair of lenses 20a and 20b. Light entering the wavelength routing element 10' from the input port 12 forms a diverging beam 18, which includes the different spectral bands. The beam 18 encounters the first lens 20a, which collimates the light and directs it to the grating 25'. The grating 25' disperses the light so that collimated beams at different wavelengths emerge from the beam and proceed. The collimated beams, one of which is shown, encounter the second lens 20b, which focuses the beams. The focused beams encounter respective ones of a plurality of dynamically configurable retroreflection elements 30 to retroreflect attenuated beams back to lens 20b, where they are collimated and directed to the grating 25'. On the second encounter, the grating 25' removes the angular separation between different beams, which are then focused onto respective output ports 15 depending on the configuration of the retroreflecting elements 30.

The embodiment shown in FIGS. 2A and 2B may be considered an unfolded version of the embodiment shown in FIGS. 1A–1C. In a specific implementation, the input port, lens 20a, grating 25', lens 20b, and retroreflecting elements 30 are spaced at approximately equal intervals, with the two lenses having equal focal lengths and the distance between the input port 12 and the retroreflecting elements 30 being four times the focal length. Thus, the focal lengths and the relative positions define what is referred to as a "4f relay" between the input port 12 and the retroreflecting elements 30, and also a 4f relay between the retroreflecting elements 30 and the output port(s) 15. The optical system may be telecentric.

Figure 3:
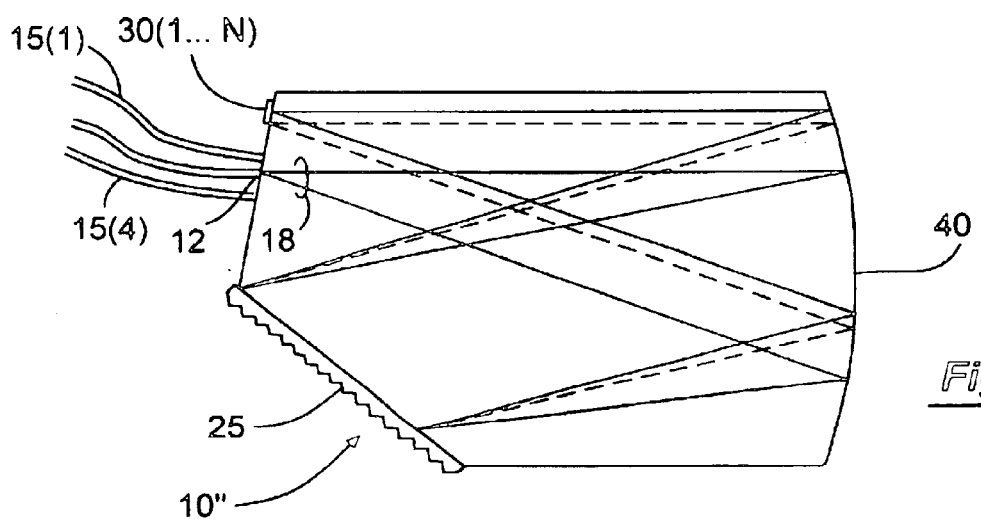
FIG. 3 is a schematic top view of an optical routing element according to a third embodiment of the invention.

FIG. 3 is a schematic top view of another embodiment of a wavelength routing element 10" that may be considered to be a further folded version the embodiment of FIGS. 1A–1C. This embodiment is a solid-glass embodiment that uses a concave reflector 40 in place of the lens 20 of the embodiment shown in FIGS. 1A–1C, or in place of lenses 20a and 20b of the embodiment shown in FIGS. 2A and 2B. As for the other embodiments, light entering the wavelength routing element 10" from the input port 12 forms a diverging beam 18 that includes the different spectral bands. The beam is collimated by the concave reflector 40, which directs it to the reflective diffraction grating 25. The grating 25 disperses the light so that collimated beams at different wavelengths are directed at different angles back towards the reflector 40. Two such beams are shown explicitly, one in solid lines and one in dashed lines. Since these collimated beams encounter the reflector 40 at different angles, they are focused at different points in a transverse focal plane.

The focused beams encounter retroreflecting elements 30 located near the focal plane. The operation in the reverse direction is as described in connection with the embodiments above, and the beams follow the reverse path, which, for clarity, are not shown in FIG. 3. On this return path, the beams encounter the concave reflector 40, the reflective grating 25, and the concave reflector 40, the final encounter with which focuses the beams to the desired output ports 15.

3. Retroreflector Structures

Each of the N dynamically configurable retroreflecting elements in any of the embodiments described above, or in other wavelength routing element structures using different optical-train configurations, may be configured in different ways according to different embodiments of the invention. In one embodiment, illustrated in perspective view in FIG. 4A, the dynamically configurable retroreflecting element 400 comprises a first reflective surface 410 and a plurality M of second reflective surfaces 402. The element 400 is configured for retroreflection of an optical ray 416 whose direction is orthogonal to a reference plane. The first reflective surface 410 is inclined with respect to the reference plane to redirect the optical ray 416 and is configured for rotation about an axis 420 to a plurality of positions so that the optical ray 416 may be redirected in different directions. Each of the second reflective surfaces 402 is disposed so that for at least one of those positions, it is also encountered by the optical ray; when the first reflective surface 410 is in that position, the second reflective surface 402 encountered is inclined with respect to it.

Figure 4A:
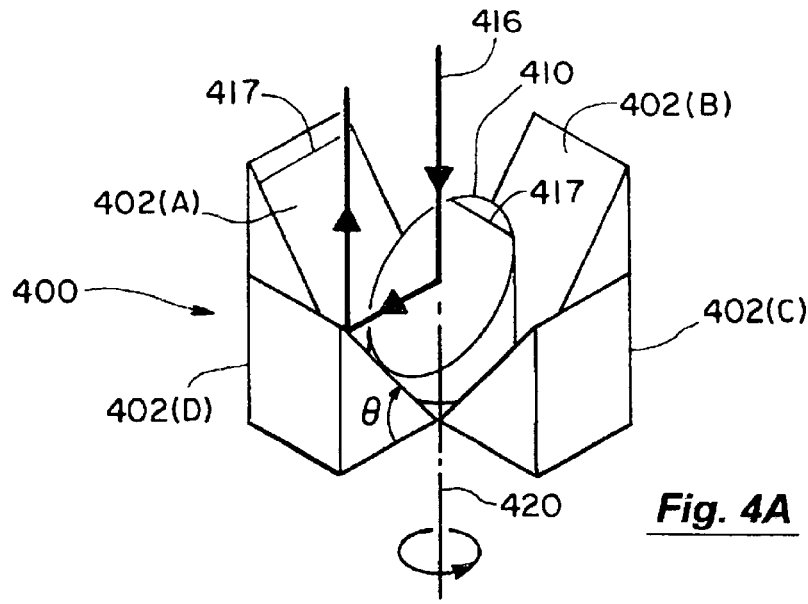
FIG. 4A is a perspective view of a dynamically configurable retroreflecting element according to a first embodiment of the invention.

The illustration in FIG. 4A shows a specific embodiment for the element that uses M=4 second reflecting surfaces 402 that are configured with respect to the first reflecting surface 410 to accommodate the quincuncial port arrangement shown in FIG. 1C. In the illustrated embodiment, the axis of rotation 420 for the first reflective surface 410 is orthogonal to the reference plane. In addition, in the illustrated embodiment, each of the second reflective surfaces 402 is fixed in position with a common angle θ relative to the reference plane. Such features are not required in other embodiments. FIG. 4A further illustrates an embodiment in which the included angle between the first reflective surface 410 and each of the second reflective surfaces 402 is approximately 90° for each of the positions of the first reflective surface 410. In one embodiment, θ is substantially equal to 45° so that the optical ray 416 propagates along a path parallel to the reference plane after encountering the first reflective surface. Also, the first reflective surface 410 is shown as having an elliptical shape, with a circular projection on the reference plane. While such a shape advantageously exploits a rotational symmetry within the system, it is not required.

For notational purposes only, marks 417 are drawn on surfaces 410 and 402(A) in FIG. 4A to demonstrate how such marks are used in other figures to denote which end of a surface is higher above the reference plane. Such marks 417 are not included on the actual structures and are used solely notationally.

Figure 4B:
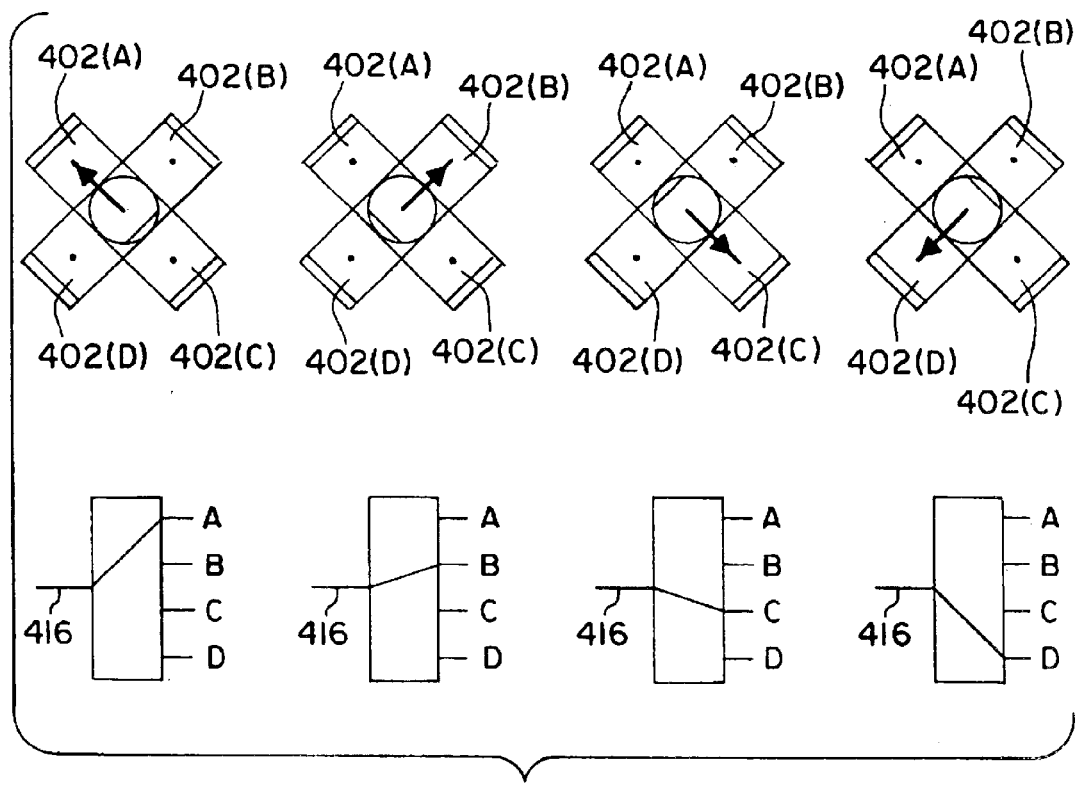
FIG. 4B is a schematic illustration of switching positions and functions that may be achieved with the dynamically configurable retroreflecting element shown in FIG. 4A.

This notation is used in FIG. 4B, in which the top row provides a top view of the element 400 of FIG. 4A in four (i.e., equal to A) different orientations. Each subsequent view from left to right results from a 90° rotation of the first reflective surface 410 about axis 420. The corresponding schematic diagram in the bottom row of FIG. 4B provides a schematic illustration of the manner in which the optical ray 416 is routed by the element 400 in each position. Thus, in a first position, corresponding to the first column of FIG. 4B, the first reflective surface 410 is positioned to redirect the optical ray 416 towards second reflective surface 402(A). In each subsequent column, the optical ray 416 is directed to the next second reflective surface so that in the last column, the element 400 is in the configuration shown in FIG. 4A, with the optical ray directed to second reflective surface 402(D).

Figure 5A:
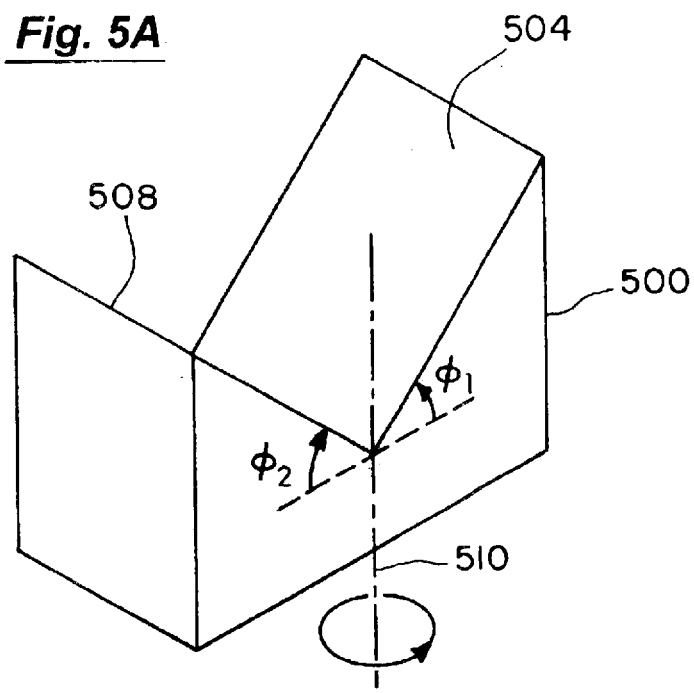
FIG. 5A is a perspective view of a dynamically configurable retroreflecting element according to a second embodiment of the invention.

Another embodiment for the dynamically configurable retroreflecting elements is shown in perspective view in FIG. 5A. In this embodiment, the element 500 includes a first reflective surface 504 and a second reflective surface 508 disposed in a fixed inclined relationship with respect to each other. Such a fixed relationship may be maintained as shown in the figure by having the first and second surfaces comprised by a common structure. The first reflective surface 504 is configured for rotation about an axis 510 that is oriented to be substantially parallel to the incident propagation path of an optical ray. The first and second reflective surfaces are respectively inclined by angles $\phi_1$ and $\phi_2$ with respect to a plane that is orthogonal to the axis 510. In some embodiments $\phi_1 = \phi_2$ and in some embodiments the first and second reflective surfaces have an included angle that is substantially equal to 90°. In one embodiment, $\phi_1 = \phi_2 = 45°$.

Figure 5B:
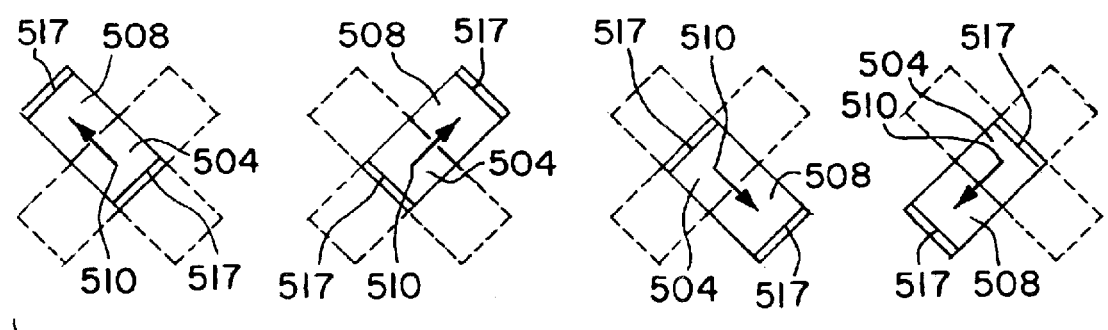
FIG. 5B is a schematic illustration of switching positions that may be achieved with the dynamically configurable retroreflecting element shown in FIG. 5A.

The element 500 in this embodiment may assume as many positions as necessary to accommodate the number M of output ports that may be provided in the wavelength routing element. For purposes of illustration, FIG. 5B shows the positions that may be used where the ports are arranged quincuncially as shown in FIG. 1C. In such an embodiment, the element 500 is configured to adopt four positions separated by an angle of 90°, corresponding to the four top views shown in FIG. 5B. As in previous figures, the illustrations in FIG. 5B include a notational mark 517 to indicate which end of individual structures is raised. This mark is used only for notational purposes and has no functional role.

Figure 6A:
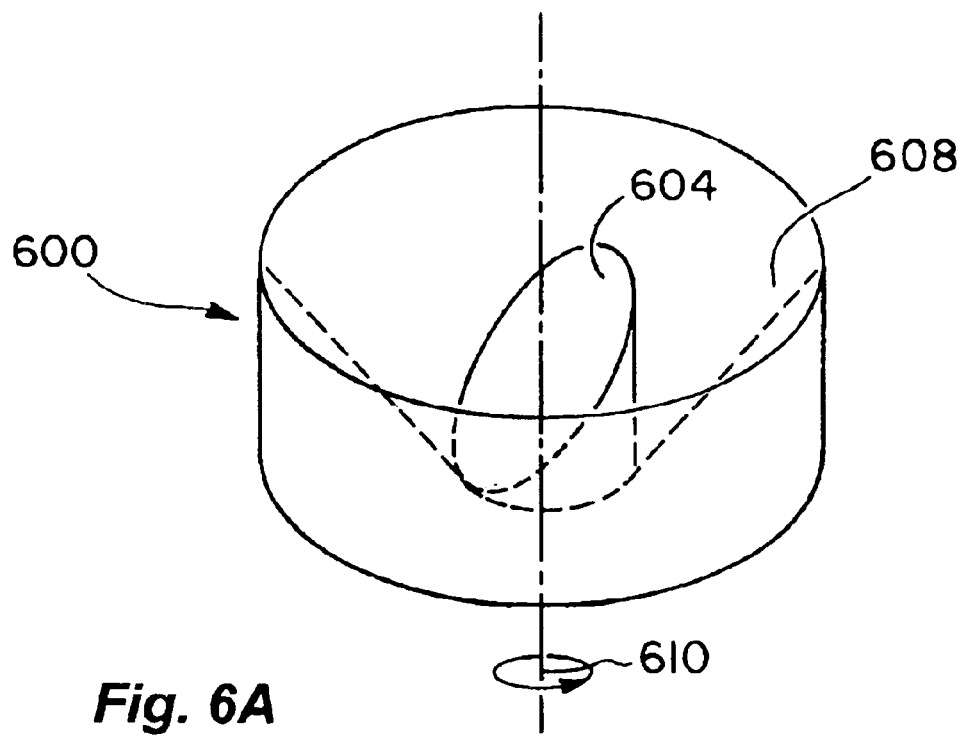
FIG. 6A is a perspective view of a dynamically configurable retroreflecting element according to a third embodiment of the invention.

Still another embodiment for the dynamically configurable routing elements is shown in perspective view in FIG. 6A. In this embodiment, the element 600 comprises a first reflective surface 604 and a second reflective surface 608. The second reflective surface 608 has a frustoconical shape concentric about an axis 610 around which the first reflective surface 604 is disposed to rotate. The basic operation of this embodiment is similar to the operation of the embodiment shown in FIGS. 4A and 4B. In fact, this embodiment may be considered to be a generalization of the embodiment of FIGS. 4A and 4B where the frustoconical surface 608 corresponds to the limiting case M→∞ for the number of second reflective surfaces 402.

The embodiment shown in FIG. 6A may accommodate any number of output ports. For example, with the quincuncial arrangement of FIG. 1C, the first reflective surface 604 is configured to adopt at least the same four distinct positions as the first reflective surface 410 shown in FIG. 4A. In these distinct positions, the frustoconical reflective surface 608 is situated to perform the same function as performed by the individual second reflective surfaces 402 of FIG. 4A. For port arrangements that use larger (or smaller) numbers of out-out ports, the same general structure shown in FIG. 6A may also be used, with at least the first reflective surface 604 configured to adopt a different number of discrete positions.

One difference between the embodiments of FIG. 4A and of FIG. 6A is that in any position for the first reflective surface 410 or 604, the second reflective surface 402 of FIG.

4A is flat while the second reflective surface 608 of FIG. 6A is curved. Accordingly, in one embodiment, as shown schematically in the side view of FIG. 6B, optical rays 614 are configured to be incident on the element 600 so that they are substantially focused when they encounter the second reflective surface 608. With such an arrangement, optical aberrations that might otherwise arise from curvature of the second reflective surface 608 are mitigated. In an alternative embodiment, such aberrations are instead mitigated by providing a compensating curvature to the first reflective surface 604.

Figure 6B:
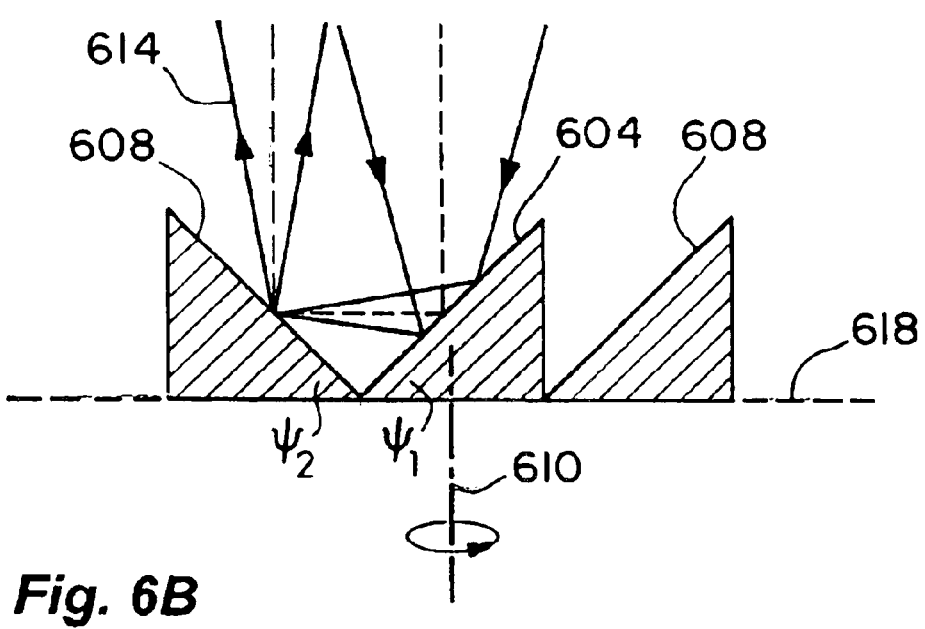
FIG. 6B is a cross-sectional view illustrating the propagation of optical beams with the dynamically configurable retroreflecting element shown in FIG. 6A.

The side view of FIG. 6B also shows that the first and second reflective surfaces are inclined with respect to a direction of an optical ray, which may be defined as propagating along a direction orthogonal to a reference plane 618. The angles of the first and second reflective surfaces are respectively denoted as $\psi_1$ and $\psi_2$ in FIG. 6B. Such angles may be selected so that the included angle between the first and second reflective surfaces is substantially equal to 90°. In one such embodiment, $\psi_1 = \psi_2 = 45°$. Techniques for MEMS fabrication of such angled surfaces are known to those of skill in the art.

4. Rotation Mechanisms

In each of the retroreflector implementations discussed above, the retroreflector element includes a first reflective surface configured for rotation about an axis to a plurality of positions. In some embodiments, the plurality of positions comprises a continuum of positions while in other embodiments, the plurality of positions comprises a plurality of discrete positions. Examples of mechanisms that may be used in each of such embodiments are provided in FIGS. 7 and 8. For MEMS implementations of the retroreflector embodiments, such rotation mechanisms may be fabricated using standard MEMS techniques known to those of skill in the art.

Figure 7:
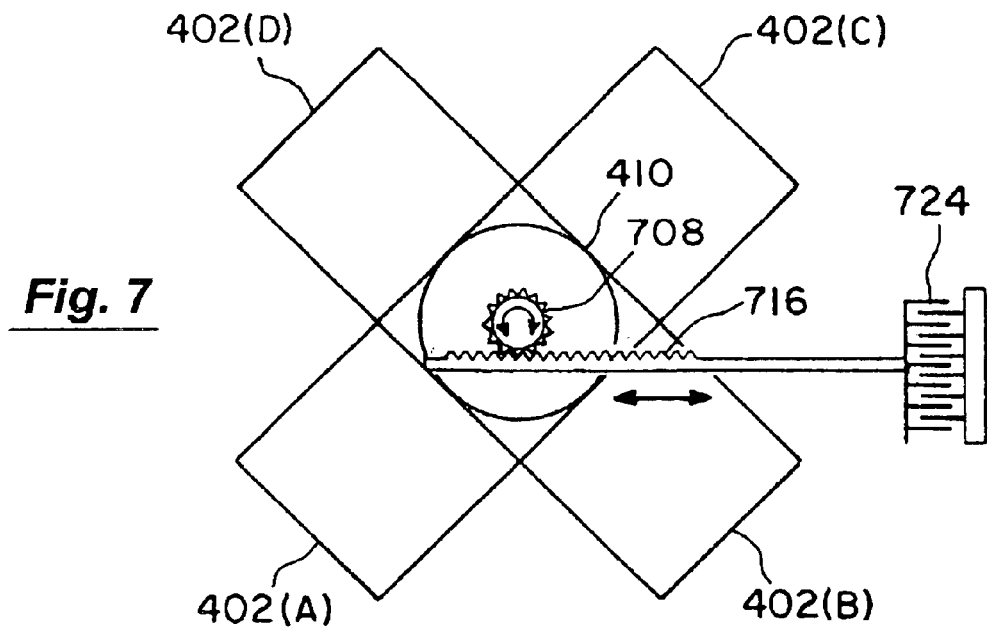
FIG. 7 is a schematic illustration of a first embodiment for achieving different switching positions for dynamically configurable retroreflecting elements.

In FIG. 7, an embodiment is shown in which a rotation mechanism is provided that may achieve substantially a continuum of positions. For illustrative purposes, the rotation mechanism is shown for the retroreflector-element embodiment of FIG. 4A, and thus FIG. 7 may be considered to be a bottom view of the structure of FIG. 4A. A comb actuator 724 is configured to provide translational motion to a connecting member 716 that is configured for engagement with a gear 708. The gear 708 is affixed with the first reflective surface 410 and may be rotated to a desired position by appropriate actuation of the comb actuator 724.

Embodiments using a rotation mechanism that provides a continuum of positions permits the optical attenuation of each wavelength to be varied independently, as described in copending, commonly assigned U.S. Prov. Pat. Appl. No. 60/363,724, entitled "VARIABLE WAVELENGTH ATTENUATOR FOR SPECTRAL GROOMING USING MICROMIRROR ROUTING," by Samuel Paul Weaver, the entire disclosure of which is herein incorporated by reference. As described therein, small changes in mirror position such as may be achieved with a continuous rotation mechanism may be used to affect attenuation of a particular optical ray while still directing the optical ray to the appropriate output port.

Figure 8:
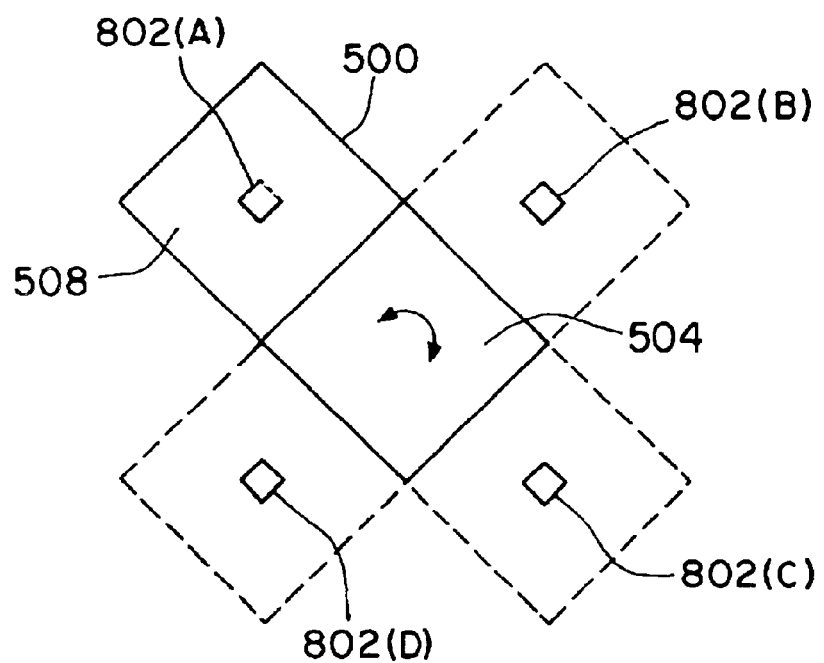
FIG. 8 is a schematic illustration of a second embodiment for achieving different switch positions for dynamically configurable retroreflecting elements.

In FIG. 8, an embodiment is shown in which a rotation mechanism is provided that may achieve a discrete number of positions. For illustrative purposes, the mechanism is shown for the retroreflector-element embodiment of FIG. 5A, and thus FIG. 8 may be considered to be a top view of the structure of FIG. 5A. At discrete positions around the first reflective surface, electrodes 802 are positioned on a surface orthogonal to the axis of rotation at a plurality of positions used to define the discrete positions of the first reflective surface 504. The underside of a structure 500 that comprises the first reflective surface includes a metallic portion that is electrostatically attracted to one of the plurality of electrodes when that electrode is activated. Rotation of the first reflective surface from one of the discrete positions to another includes activating the electrode 802 that defines the desired new position (and deactivating the electrode 802 that defines the existing electrode position if it has not previously been deactivated). The resulting change in electrostatic attraction felt by the metal portion causes the structure 500 to move to that position.

While specific mechanisms have been described to achieve both a continuum of positions or a discrete number of positions for the first reflective surface, alternative mechanisms may also be used without departing from the spirit of the invention. Also, while a specific example of each type of rotation mechanism has been described with reference to a particular embodiment for the retroreflector element, it will be understood that each of the mechanisms described may be applied to any of the retroreflector embodiments discussed herein.

5. Wavelength Routing Elements With off Positions

In some applications, it is desirable for wavelength routing elements, such as those described with respect to FIGS. 1A–3, to include "off" positions in which one or more individual spectral bands are not directed to any active output ports. Such applications may be accommodated in accordance with embodiments of the invention by including one or more inactive positions for the retroreflector. Examples of configurations that accommodate such off positions are illustrated in FIGS. 9A–9C.

Figure 9A:
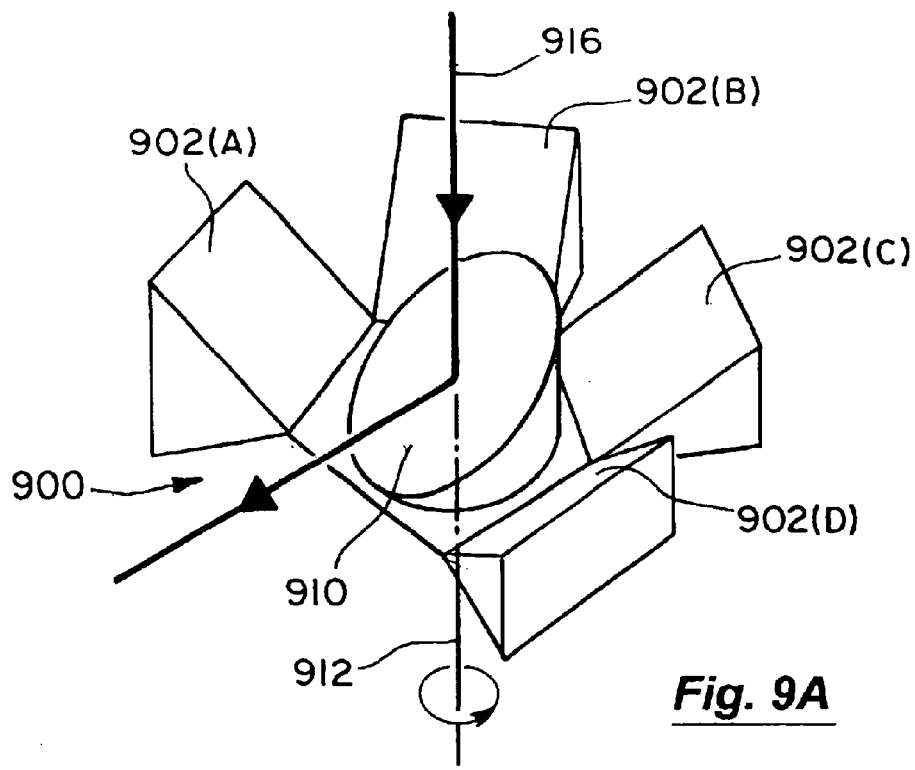
FIGS. 9A–9C illustrate different embodiments of dynamically configurable retroreflecting elements that include an off position.
Figure 9B:
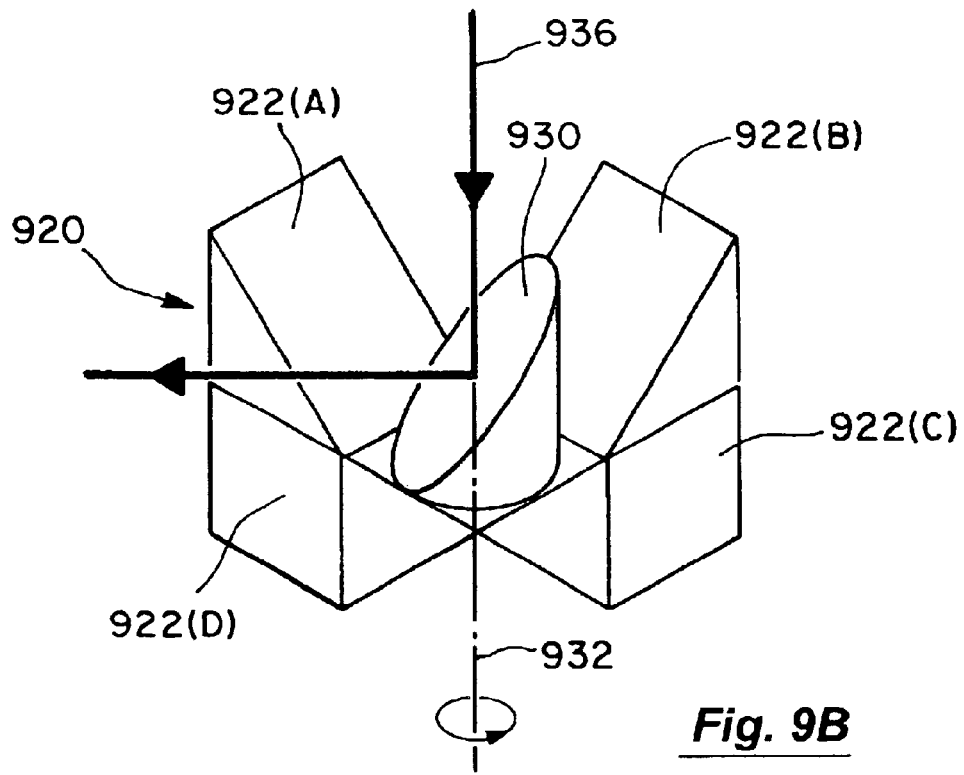

FIGS. 9A and 9B provide perspective views of embodiments of retroreflector elements 900 and 920 similar to the embodiment shown in FIG. 4A. In each instance, the retroreflector is configured for use in a one-to-four wavelength routing element. Accordingly, each of the retroreflectors has at least four active positions and one inactive position. In FIG. 9A, the total number of required positions, i.e. five positions, are treated equivalently in arranging the plurality of second reflective surfaces 902 around the first reflective surface 910. In this configuration, the four active positions are defined by rotating the first reflective surface 910 about an axis 912 to any of four sides of a pentagonal shape and the inactive position is defined by rotating the first reflective surface 910 to the fifth side of the pentagonal shape. In FIG. 9A, the element 900 is shown in its inactive position so that an optical ray 916 is simply lost after encountering the first reflective surface 910; in that position, there is no second reflective surface positioned also to encounter the optical signal. In an alternative embodiment, a nonreflective surface may be provided at the fifth side of the pentagonal shape. In wavelength routing elements that use a retroreflector such as shown in FIG. 9A, the optical ports may be arranged as shown generally in FIG. 10B.

In FIG. 9B, only the number of active positions is used in determining a general orientation for the second reflective surfaces 922 around the first reflective surface 930. Accordingly, the four active positions for the element 920 are the same as shown in FIG. 4A and are defined by rotation the first reflective surface 930 about an axis 932 to any of the four sides of a square shape. The inactive position reflects an optical ray 936 from the first reflective surface 930 between two of the second reflective surfaces 922. Since the arrangement of second reflective surfaces 922 is the same in FIG. 9B as in FIG. 4A, the optical ports may be provided in a wavelength routing element in the same quincuncial arrangement shown in FIG. 1C (or in FIG. 10A).

Figure 9C:
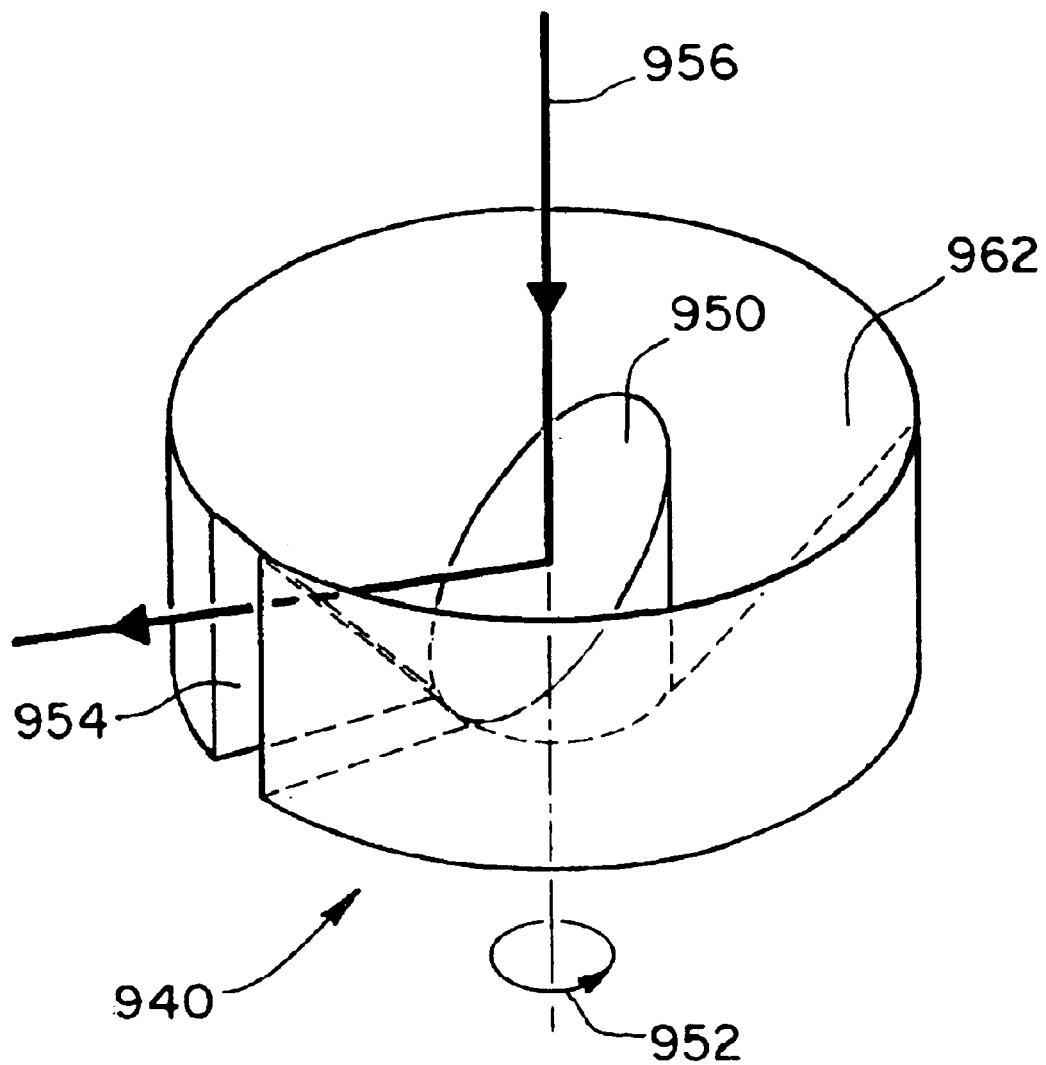

FIG. 9C also shows an embodiment in which the optical port arrangement within a wavelength routing element may be the same whether configured with or without an off position. The retroreflector 940 has a configuration that corresponds to the configuration shown in FIG. 6A, having a frustoconical reflective surface 962 surround a first reflective surface adapted for rotation about an axis 952, except that a portion 954 of the frustoconical reflective surface has been removed. This missing portion permits an optical ray 956 to be lost after reflection from the first reflective surface 950 when the first reflective surface 950 is in the appropriate position. In an alternative embodiment, a complete frustoconical surface is provided, but only a portion (contiguous or noncontiguous in different embodiments) of the surface is made reflective. In such an embodiment, the absorptive portion corresponds to one or more inactive positions.

It is also possible in alternative embodiments to provide a wavelength routing element having off positions by omitting output ports at positions where light would otherwise be directed. For example, if the wavelength routing element is to have M on positions and M' off positions, each retroreflector comprised by the wavelength routing element may be configured with M+M' positions. When a particular retroreflector is in one of the M positions, the optical ray is directed to a respective one of the M output-port positions. When that retroreflector is instead in one of the M' positions, the optical ray is directed to a respective point in the wavelength routing element where the light cannot be accepted because there is no output port present.

In embodiments having a rotation mechanism that achieves substantially a continuum of positions for the first reflective surface, off positions may be realized by rotating the first reflective surface to a misaligned position. For example, with the retroreflector implementation shown in FIG. 5A, rotating the element 500 to a position that directs an incident optical ray to none of the output ports is sufficient to effect the off position. This is similarly true with the retroreflector implementation shown in FIG. 6A where some positions of the first reflective surface 604 that may be achieved with a continuous rotation mechanism correspond to none of the output ports.

6. Optical Port Arrangements

To accommodate different embodiments of the invention, optical ports may be configured in different ways on a wavelength routing element. In embodiments where the optical port is at the end of an optical fiber, the optical fibers may be configured in different ways also. In one embodiment, the optical port assembly, which includes both input and output ports, comprises a rectangular prism made of a material such as silicon. Optical fibers may be connected with the prism so that the ports are at the ends of the output fibers. Each such optical fiber generally includes a core and a cladding layer. The core is the inner part of the fiber through which light is guided. It is surrounded completely by the cladding layer, which has a lower refractive index so that a light ray in the core that strikes the core/cladding boundary at a glancing angle is confined within the core by total internal reflection. Examples of the prism structures are shown in FIGS. 10A and 10B, which illustrate possible port configurations for a wavelength routing element with a single input port and four output ports.

Figure 10A:
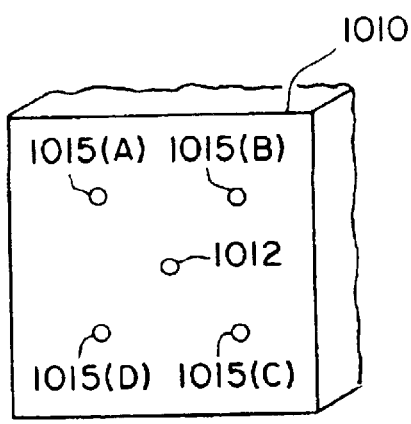
FIGS. 10A–10E illustrate different arrangements that may be used for optical ports in accordance with embodiments of the invention.
Figure 10B:
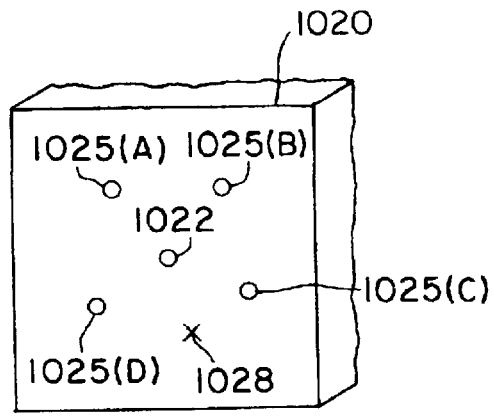

The port arrangement shown in FIG. 10A is silicon prism 1010 that includes a quincuncial arrangement with the four output ports 1015 distributed at vertices of a rectangle surrounding a central input port 1012. This arrangement is suitable for the retroreflector implementations shown in FIGS. 4A, 5A, 6A, 9B, and 9C, the last two of which include an inactive position. The port arrangement shown in FIG. 10B is a silicon prism 1020 that includes a central input port 1022 surrounded equidistantly by four output ports 1025 that lie on vertices of a regular pentagon. The fifth vertex 1028 of the pentagon is unused and may correspond to a location where light may be directed when a retroreflector element is in an inactive position. This arrangement is suitable for a variety of the illustrated retroreflector implementations. For example, the retroreflector implementation shown in FIG. 9A may be used for the port arrangement shown in FIG. 10B. Alternatively, a retroreflector implementation similar to that shown in FIG. 9A, but substituting the inactive position with a fifth active position by having five second reflective surfaces 902 around the first reflective surface, may also be used for the port arrangement shown in FIG. 10B. Further, the retroreflector implementations shown in FIGS. 5A and 6A may also be used for the port arrangement shown in FIG. 10B.

To provide optical ports at the end of optical fibers in such orientations, the fibers may be bundled together with spacers of specific diameter as needed. Such an arrangement 1030 is suitable for the retroreflector embodiments described herein having a first reflective surface that is configured for rotation about an axis. The spacing between individual ports is controlled by the respective diameters of the fibers and spacers. The fibers will generally have standard diameters determined by the size of the core and cladding layers. The desired diameters may be achieved through removal of a portion of the cladding layer where a smaller diameter is desired and through coating of the cladding layer where a larger diameter is desired.

Figure 10C:
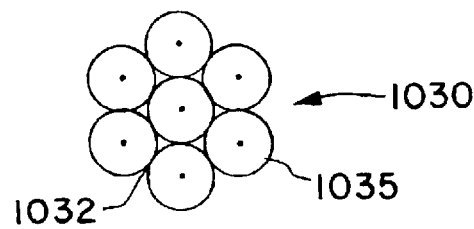
Figure 10D:
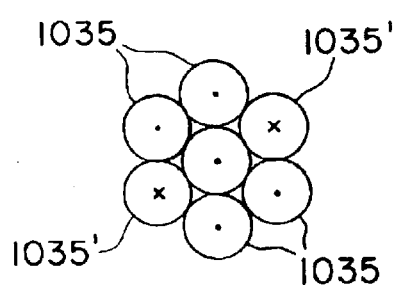
Figure 10D:
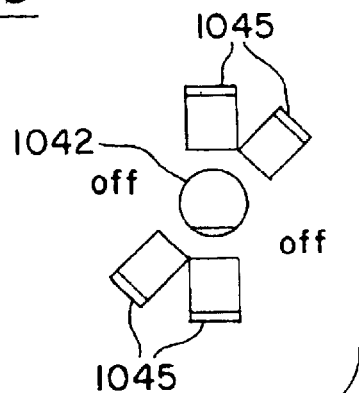

In one embodiment, shown in an end view in FIG. 10C, a fiber arrangement for a one-to-six wavelength routing element is provided by bundling seven fibers together, with the input fiber 1032 being surrounded by six output fibers 1035 according to their tightest packing. By squeezing the fibers together uniformly, the core-to-core spacings are equal to the diameter of a single fiber. This geometry may also be used for a one-to-four wavelength routing element having two off positions, as shown in an end view in the left portion of FIG. 10D, by replacing two of the output fibers 1035 with spacers 1035' of the same diameter. The corresponding retroreflecting element for such a wavelength routing element is shown in the right portion of FIG. 10D with a rotatable first reflective surface 1042 and four fixed second reflective surfaces 1045 positioned at four of the vertices of a regular hexagon. The two other vertices of the hexagon correspond to inactive positions (labeled "off" in the figure). Embodiments that use at least one spacer have the advantage that the spacer may be used as a straightness reference during binding, thereby simplifying alignment of the fibers.

Figure 10E:
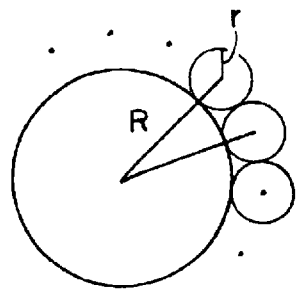

By changing a ratio of the diameter of the input fiber to the diameter of the output fibers, the number of tightest packed fibers that can encircle the inner fiber can be varied, effectively setting the M of the one-to-M wavelength routing element in such embodiments. Referring to FIG. 10E, which shows an end view for an input fiber having a radius R and M output fibers having radius r, the fiber radii are related according to the following:

$$R(r, M) = \left( \frac{1}{\sin\frac{\pi}{M}} - 1 \right).$$

7. Macroscopic Retroreflecting Elements

In the embodiments described above, the retroreflecting elements are described as elements configured for retroreflection of a single spectral band within a wavelength routing element. Such elements are typically provided as microscopic MEMS devices fabricated using MEMS techniques known to those of skill in the art. Within the wavelength routing element, as many retroreflection elements are provided as there are spectral bands that may require routing.

It is noted, however, that similar structures to those described above may alternatively be provided in accordance with other embodiments in a macroscopic form. Such macroscopic embodiments may use graded-index ("GRIN") lenses to collimate light from an input fiber and larger macroscopic MEMS arrays to route the beams. Such an arrangement will generally be less costly than the microscopic arrangement by reducing requirements for precision, and is suitable for applications in which the routing is to performed on all spectral bands of a beam.

Having described several embodiments, it will be recognized by those of skill in the art that various modifications, alternative constructions, and equivalents may be used without departing from the spirit of the invention. For example, while embodiments have illustrated the use of a grating as a dispersion element, alternative embodiments may use a prism for the same function. It is noted in addition that the one-to-M optical switches described herein may be used as building blocks in larger cross-connect architectures. Specific examples of such larger cross-connect architectures are provided in copending, commonly assigned U.S. patent application Ser. No. 10/093,844 entitled "OPTICAL CROSS CONNECT ARCHITECTURES USING WAVELENGTH ROUTING ELEMENTS," by Edward J. Bortolini et al., the entire disclosure of which is herein incorporated by reference for all purposes. Accordingly, the above description should not be taken as limiting the scope of the invention, which is defined in the following claims.

What is claimed is:

1. An element for retroreflecting an optical ray incident orthogonal to a plane, the element comprising:

a first reflective surface inclined with respect to the plane and configured for rotation about an axis to a plurality of positions, the first reflective surface being disposed to encounter the optical ray; and a second reflective surface inclined with respect to the first reflective surface to provide an included angle of substantially 90° between the first and second reflective surfaces, wherein the second reflective surface comprises a frustoconical reflective surface disposed to surround the first reflective surface.

2. The element recited in claim 1 wherein the frustoconical reflective surface is concentric about the axis.

3. The element recited in claim 1 wherein the frustoconical reflective surface is disposed such that the optical ray is substantially focused upon encountering the frustoconical reflective surface.

4. The element recited in claim 1 wherein the frustoconical reflective surface includes a gap through which the optical ray is directed in at least one of the plurality of positions.

5. The element recited in claim 1 wherein the frustoconical reflective surface includes an absorptive portion to which the optical ray is directed in at least one of the plurality of positions.

6. The element recited in claim 1 wherein the plurality of positions comprises a continuum of positions.

7. The element recited in claim 1 wherein the plurality of positions comprises a plurality of discrete positions.

8. A method for directing an optical ray, the method comprising:

reflecting the optical ray from a first reflective surface towards a second reflective surface, wherein both the first and second reflective surfaces are inclined with respect to a plane orthogonal to a propagation direction of the optical ray and have an included angle substantially equal to 90°; and rotating the first reflective surface about an axis orthogonal to the plane to one of a plurality of positions, wherein the second reflective surface comprises a frustoconical reflective surface disposed to surround the first reflective surface.

9. The method recited in claim 8 further comprising focusing the optical ray on the frustoconical reflective surface.

10. The method recited in claim 8 wherein the plurality of positions comprises a continuum of positions.

11. The method recited in claim 10 further comprising attenuating the optical ray.

12. The method recited in claim 8 wherein the plurality of positions comprises a plurality of discrete positions.

13. An element for retroreflecting an optical ray orthogonal to a plane, the element comprising:

first reflecting means inclined with respect to the plane and configured for rotation about an axis to a plurality of positions, the first reflecting means being disposed to encounter the optical ray; and a second reflecting means inclined with respect to the first reflecting means for at least one of the plurality of positions and providing an included angle of substantially 90° between the first and second reflecting means, wherein the second reflecting means comprises a frustoconical reflecting means disposed to surround the first reflecting means.

14. A one-to-M wavelength routing element for receiving, at an input port, light having a plurality of spectral bands, and directing selected ones of the spectral bands to one or more of M output ports, the one-to-M wavelength routing element comprising:

a free-space optical train disposed between the input port and the M output ports providing optical paths for routing the spectral bands, the optical train having a dispersive element disposed to intercept the light traveling from the input port; and a routing mechanism having a plurality of dynamically configurable retroreflecting elements, each such dynamically configurable retroreflecting element including:

a first reflective surface inclined with respect to a plane and configured for rotation about an axis to a plurality of positions; and a second reflective surface inclined with respect to the first reflective surface for at least one of the plurality of positions, wherein:

the second reflective surface comprises a frustoconical reflective surface disposed to surround the first reflective surface; and $M \geq 2$.

15. The wavelength routing element recited in claim 14 wherein, for each of the plurality of dynamically configurable retroreflecting elements, at least one of the plurality of positions causes a corresponding spectral band to be directed to none of the M output ports.

16. The wavelength routing element recited in claim 14 wherein:

the input port is at the end of an input fiber;

each of the output ports is at the end of an output fiber; and output fibers are disposed circumferentially about the input fiber.

* * * * *